Figure 1:
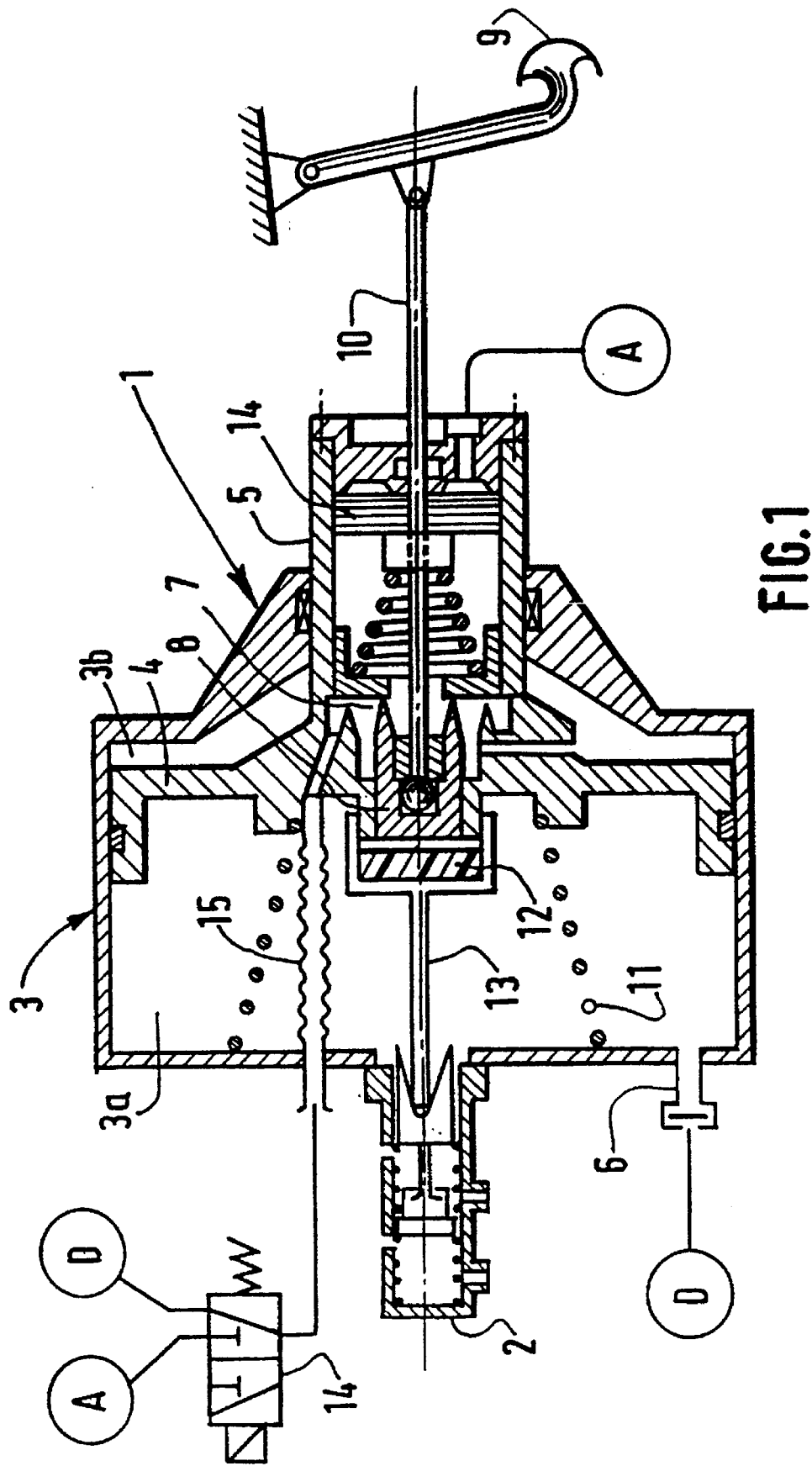

United States Patent [19]
Castel et al.

[11] Patent Number: 5,653,514
[45] Date of Patent: Aug. 5, 1997

[54] AUTOMATICALLY CONTROLLED BOOSTED BRAKING SYSTEM WITH MONITORED RESERVE

[75] Inventors: Philippe Castel, Paris; Christian Douillet, Puteaux; Gilbert Kervagoret, Argenteuil, all of France

[73] Assignee: AlliedSignal Europe Services Techniques, Drancy, France

[21] Appl. No.: 313,144

[22] PCT Filed: Sep. 8, 1994

[86] PCT No.: PCT/FR94/01059

§ 371 Date: Sep. 30, 1994

§ 102(e) Date: Sep. 30, 1994

[87] PCT Pub. No.: WO95/10436

PCT Pub. Date: Apr. 20, 1996

[30] Foreign Application Priority Data

Oct. 12, 1993 [FR] France ................................ 93 12088

[51] Int. Cl.⁶ ...................................................... B60T 8/44
[52] U.S. Cl. ...................................... 303/113.3; 303/114.3; 91/6; 137/627.5
[58] Field of Search ............................... 303/139, 113.2, 303/113.3, 114.3, 118.1, 125; 91/6, 32; 60/545; 137/627.5, 103

[56] References Cited

U.S. PATENT DOCUMENTS

| | | | |
|---|---|---|---|
| 3,364,818 | 1/1968 | Hager et al. | 91/32 X |
| 4,208,872 | 6/1980 | Shimizu et al. | 91/32 X |
| 4,667,471 | 5/1987 | Fulmer et al. | 303/191 X |
| 5,046,314 | 9/1991 | Levrai | 137/527.5 X |
| 5,067,524 | 11/1991 | Pickenhahn | 137/627.5 |

FOREIGN PATENT DOCUMENTS 58-188746  4/1983  Japan.

*Primary Examiner*—Lee W. Young
*Attorney, Agent, or Firm*—Lee H. McCormick, Jr.

[57] ABSTRACT

An automatically controlled braking system comprising a pneumatic vacuum servo and a pneumatic solenoid valve capable of selectively connecting the serov to first or second sources of pressure. The solenoid valve includes a flap valve which is subjected to a suction force proportional to the difference between the first and second source of pressured and acts in the same direction as an electromagnetic actuating force. Elastic means act on and apply a greater force to the flap valve to oppose the suction force. A current generator supplies a current having a predetermined maximum intensity to the solenoid to develop an actuation force overcome the elastic force and effect actuation of the vacuum servo.

2 Claims, 2 Drawing Sheets

AUTOMATICALLY CONTROLLED BOOSTED BRAKING SYSTEM WITH MONITORED RESERVE

The present invention relates to an automatically controlled braking system for a motor vehicle, comprising: a pneumatic vacuum servo provided with at least a first adjustable-pressure chamber; first and second pressure sources respectively delivering a relatively low pressure and a relatively high pressure; a pneumatic solenoid valve connected to the two sources of pressure and to the first chamber of the servo and comprising an electromagnet capable of transmitting an actuating force to a flap valve capable of isolating, on the one hand, the first pressure source from the second permanently, and, on the other hand, the first chamber from one or other of the two sources depending on a control current selectively supplied to the electromagnet; and a switchable current generator capable of powering the electromagnet selectively.

Systems of this type, well known in the prior art especially by virtue of the American U.S. Pat. No. 4,667,471, make it possible to provide braking of the wheels of the vehicle without voluntary intervention from the driver of the vehicle, when circumstances require it.

These systems, which may, in particular, be used to prevent the wheels from spinning upon startup or during acceleration, when the drive torque is excessive taking account of the adherence of the vehicle to the ground, exhibit a major benefit and their application is more and more widespread.

However, under certain conditions of excessive stress, these systems risk giving rise to relative exhausting of the low pressure reserve which the first pressure source constitutes, and risks no longer being able subsequently to provide voluntary braking under optimal conditions.

Indeed, the low pressure source, which in general essentially consists of the induction pipes of the engine, represents a limited volume into which the air utilized by the servo is delivered after each activation of the latter, which tends to cause this source to be exhausted and to degrade the boost offered by the servo.

This situation is particularly unfavourable in the case of a wheel antilock system providing no control over the engine, insofar as acceleration of the latter already naturally tends to degrade performance of the low pressure source.

The present invention lies within this context and aims to guarantee constant effectiveness of voluntary braking, by preventing the low pressure reserve from being exhausted.

To this end, the braking system of the invention, moreover in accordance with the abovementioned preamble, and in which the flap valve of the solenoid valve is subject, over a pressure cross section to a suction force, the intensity of which is proportional to a pressure difference between the first and second sources and in the same direction as the actuating force, is essentially characterized in that the solenoid valve comprises elastic means capable of applying to the flap valve an elastic force of given value greater than that of the suction force and in the opposite direction, and in that the actuating force is limited to a value less than that of the elastic force.

In the simplest embodiment of the invention, the value of the actuating force is limited by making provision for the current generator to deliver a current, the mean intensity of which is less than a given threshold.

By virtue of these arrangements, the solenoid valve in some way acts as a differential pressure sensor and responds to the stresses of a control current only if the sum of the suction force and of the actuating force corresponding to this current is capable of overcoming the elastic force, which happens only if the suction force is greater than a threshold above which the first pressure source is under no risk of being exhausted.

Figure 2:
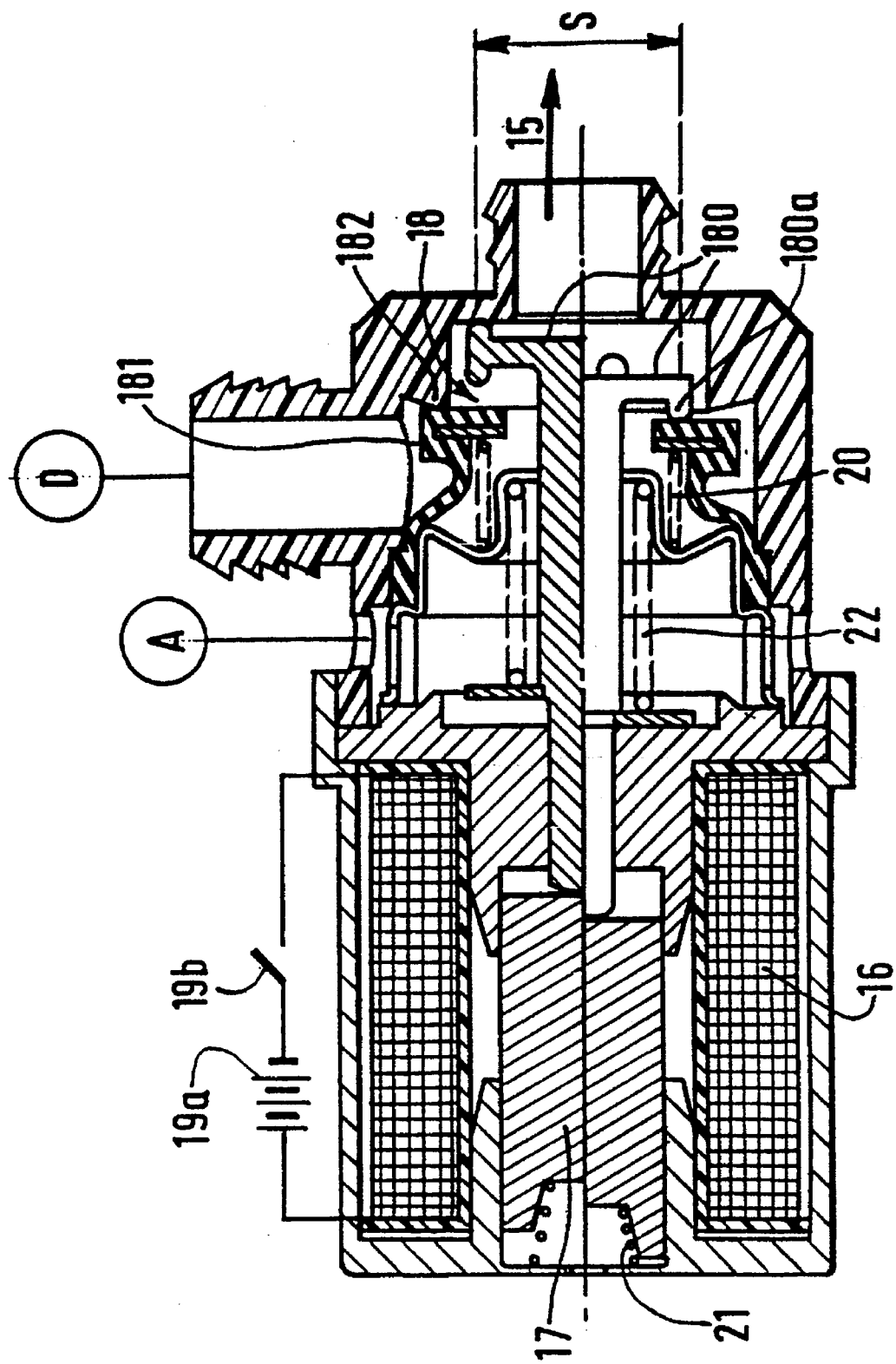

Other characteristics and advantages of the invention will emerge clearly from the description thereof which is given hereafter, by way of nonlimiting indication, with reference to the appended drawings in which:

FIG. 1 is a diagrammatic view of a braking system in accordance with the invention; and FIG. 2 is an enlarged view formed of two half sections and illustrating a solenoid valve used in the system of FIG. 1, the lower half of this figure representing the solenoid valve in its state of rest, and its upper half representing the solenoid valve in its excited state.

Insofar as the invention relates only to an improvement made to pneumatically boosted braking systems, and as the general constitution and operation of the latter are well known to the person skilled in the art, these systems will be recalled here only rapidly to allow total comprehension of the improvement which the invention represents.

Diagrammatically, a system of this type comprises a servo 1 and a master cylinder 2.

The servo itself comprises a rigid casing 3 separated into two chambers 3a and 3b in leaktight fashion by a movable partition 4 capable of entraining a pneumatic piston 5 which can move inside the casing 3.

The front chamber 3a, the front face of which is closed in leaktight fashion by the master cylinder 2, is permanently connected to a low pressure source D through a nonreturn valve 6.

The rear chamber 3b is, in contrast, capable selectively of being connected either to the low pressure source D, or to a high pressure source, for example the atmosphere A.

To this end, access to the rear chamber 3b is, for normal braking, controlled by a flap valve 7 and a plunger 8, the latter being connected to a brake pedal 9 through the use of a control rod 10.

When the control rod 10 is in the rest position, in this case pulled to the right, the flap valve 7 normally establishes communication between the two chambers 3a and 3b of the servo.

Since the rear chamber 3b is then subject to the same depression as the front chamber 3a, the piston 5 is pushed back to the right, in the position of rest, by a return spring 11.

Actuation of the plunger 8 by means of a movement of the control rod 10 to the left has the effect, in a first instance, of displacing the flap valve 7 such that it isolates the chambers 3a and 3b from one another then, in a second instance, of displacing this flap valve such that it opens the rear chamber 3b to atmospheric pressure A.

The pressure difference between the two chambers, then felt by the movable partition 4, exerts on the latter a thrust which tends to displace it toward the left, and allow it to entrain the piston 5, which is displaced in turn, thereby compressing the spring 11.

The braking effort exerted on the plunger 8 by the control rod 10, or "input force", and the brake boosting effort, or "boost force", resulting from the thrust of the movable partition 4, are added together on a reaction disk 12 in order to constitute an actuating force transmitted to the master cylinder through the use of a thrust rod 13.

As shown in FIG. 1, the braking system of the invention comprises, moreover, a pneumatic solenoid valve 14 intended to allow automatic braking of the wheels and connected, for this purpose, to two pressure sources A and D, as well as to the rear chamber 3b of the servo through the use of a bellows 15.

This solenoid valve comprises (FIG. 2) an electromagnet 16 actuating a core 17 capable of transmitting an actuating force to a flap valve 18, the electromagnet being powered selectively by a switchable current generator comprising a current source 19a and a switch 19b.

The flap valve 18 essentially consists of an actuating rod 180 carrying a movable seat 180a, and of a tubular member 181 capable of interacting with the movable seat 180a and with a fixed seat 182 inside the solenoid valve, this tubular member adopting a position defined by that of the actuating rod 180, which follows the movements of the core 17.

Depending on the position of the actuating rod 180, the tubular member 181 interacts either with the fixed seat 182 in order to isolate the rear chamber 3b from the low pressure source D (upper half of FIG. 2), or with the movable seat 180a in order to isolate the rear chamber 3b from the high pressure source A (lower half of FIG. 2), the tubular member 181 permanently interacting with one or other of the two seats in order to isolate the low pressure source D and the high pressure source A from one another.

The tubular member 181 and the core 17 are urged in the direction of the fixed seat 182 (toward the right in FIG. 2) by first and second springs 20 and 21 respectively, whereas the actuating rod 180 is urged in the opposite direction (toward the left in FIG. 2) by a third spring 22.

In the position of rest of the solenoid valve (lower half of FIG. 2), the flap valve, at the junction between the movable seat 180a and the tubular member 181, is subject, over a pressure cross section S, to a suction force, the intensity of which is proportional to the difference in pressures respectively delivered by the sources A and D, and in the same direction as the actuating force which the core 17 transmits to the actuating rod 180 when the electromagnet is powered by the generator 19a, 19b.

According to the invention, the resultant elastic force applied by the springs 20, 21 and 22 to this same flap valve 18, still at the junction between the movable seat 180a and the tubular member 181, when the solenoid valve is at rest, has a value greater than that of the suction force to which this flap valve is subject, and in the opposite direction. In concrete terms, this characteristic simply means that the actuating rod 180 is pushed back to the left of FIG. 2 for the position of rest of the solenoid valve.

Moreover, the current generator 19a, 19b delivers a current, the mean intensity of which is below a predetermined threshold, generating, on the actuating rod 180, an actuating force, the value of which is less than that of the elastic force which results from the effect of the springs 20, 21 and 22.

Under these conditions, the solenoid valve 14 can pass from its state of rest to its excited state only if a sufficient suction force is added to the actuating force of the electromagnet in order to overcome the elastic force exerted by the springs 20 to 22.

As the expert will easily understand from reading the present description, it is thus possible, by calibrating the various forces present, to make sure that the solenoid valve opens only if a sufficient pressure difference, chosen beforehand to prevent the source D from being exhausted, exists between the pressure delivered respectively by the source A and this source D.

What is claimed is:

1. An automatically controlled braking system for a motor vehicle, comprising: a pneumatic vacuum servo provided with at least a first adjustable-pressure chamber; first and second pressure sources for respectively delivering a relatively low pressure and a relatively high pressure; a pneumatic solenoid valve connected to said first and second pressure sources and to said first chamber of the servo, said solenoid valve comprising an electromagnet capable of transmitting an actuating force to a flap valve capable of selectively permanently isolating said first pressure source from said second pressure source and said first chamber from said first and second pressure sources as a function of an electric control current selectively supplied to said electromagnet; and a switchable current generator capable of selectively powering said electromagnet, characterized in that, said flap valve is subject, over a pressure cross section to a suction force, the intensity of said suction force being proportional to a pressure difference between said first and second pressure sources and in the same direction as said actuating force, said solenoid valve further comprising elastic means capable of applying to the flap valve an elastic force of a given intensity which is greater than said suction force but in an opposite direction thereto, and further said actuating force being limited to a value less that said elastic force such that only when combined with said suction force is said elastic force overcome and said flap valve moved to isolated said first chamber from said first pressure source.

2. The braking system according to claim 1, characterised in that said current generator delivers a current to said electromagnet having a mean intensity below a predetermined threshold.

* * * * *